Nov. 29, 1927. 1,650,852
L. ROUANET
PROCESS OF MANUFACTURING CAGES FOR BALL OR ROLLER BEARINGS
Filed Nov. 12, 1924
*fig 1*
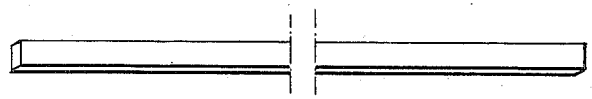
*fig 2*
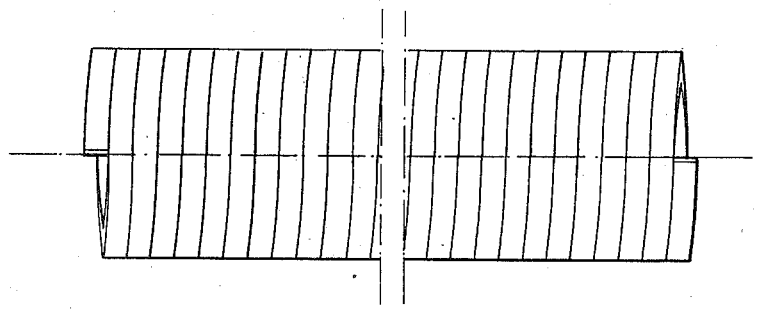
*fig 3*     *fig 4*
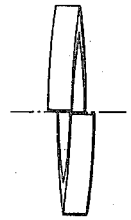 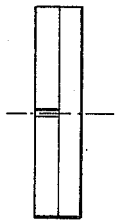
*fig 5*
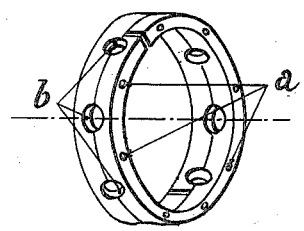
Inventor
L. Rouanet
by Marks Clerk
Attys.

Patented Nov. 29, 1927.

1,650,852

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY.

PROCESS OF MANUFACTURING CAGES FOR BALL OR ROLLER BEARINGS.

Application filed November 12, 1924, Serial No. 749,533, and in France November 22, 1923.

The present invention relates to a manufacturing process of guide members for the balls or rollers of ball or roller bearings.

The main object of the invention is to provide a manufacturing process enabling guide members to be economically obtained from the triple point of view of material, labor and tools.

To this effect, a strip or band of relatively great length is taken from any suitable material and spirally coiled in turns relatively close together. Pieces are cut in the said coil which will afterwards be expanded in the form of rings and in which are formed radially extending housings for the balls or rollers and transversely extending bores for their assembly.

The accompanying drawing shows the successive steps of manufacturing a ball cage according to the process of the invention.

In this drawing:

Fig. 1 is a perspective view of a suitable strip or band;

Fig. 2 is a front elevation of the coiled strip;

Fig. 3 is a front elevation of a piece of the coiled strip, suitable to form one of the rings.

Fig. 4 is a front elevation of two coupled rings in proper relative position for the drilling operation;

Fig. 5 is a perspective view of a ball cage according to the invention.

A strip or band (Figure 1) of suitable section and material, as for example brass, iron, steel, etc., is coiled up around a core (Figure 2). Pieces (Figure 3), cut out from this coil, after having been expanded and straightened, are coupled by pairs (Figure 4). Lateral holes $a$ (Figure 5) are then bored out, said holes being first used to temporarily maintain the two conjugate rings in suitable relative position during the boring of the radial holes $b$ (Figure 5) which will serve as housings for the balls of a ball bearing. The holes $a$ are afterwards used, when mounting the said ball bearing, for the final coupling of the two rings or conjugate halves of the cage.

It will be understood that the joint left in each ring, between the two ends of the piece obtained from the coiled band, may be welded or brazed before the boring out of the radial holes.

I claim—

1. A manufacturing process of guide members for ball or roller bearings which consists in coiling strips of suitable raw material, of relatively great length and predetermined section, cutting from the said coils pieces the length of which corresponds to the circumferential length of the desired guides; deflecting such pieces in the form of rings, temporarily holding pairs of said rings in proper relative position, and drilling in the two rings radial holes serving as housings for the balls, rollers and the like.

2. A manufacturing process according to claim 1, characterized by the fact that the rings are definitively assembled together, by pairs, with the openings in adjacent position in order to form cages for bearings with a single row of balls, rollers, and the like.

LOUIS ROUANET.